United States Patent
Fu et al.

(10) Patent No.: US 10,917,898 B2
(45) Date of Patent: *Feb. 9, 2021

(54) AUXILIARY COMMUNICATION METHOD AND SYSTEM, AND DEVICE HAVING BASE STATION FUNCTION AND TERMINAL

(71) Applicants: YULONG COMPUTER TELECOMMUNICATION SCIENTIFIC (SHENZHEN) CO., LTD., Shenzhen (CN); DONGGUAN YULONG TELECOMMUNICATION TECH CO., LTD., Dongguan (CN)

(72) Inventors: Ting Fu, Dongguan (CN); Ya-Jun Zhu, Dongguan (CN)

(73) Assignees: YULONG COMPUTER TELECOMMUNICATION SCIENTIFIC (SHENZHEN) CO., LTD., Shenzhen (CN); DONGGUAN YULONG TELECOMMUNICATION TECH CO., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/690,913

(22) Filed: Nov. 21, 2019

(65) Prior Publication Data
US 2020/0092890 A1 Mar. 19, 2020

Related U.S. Application Data

(60) Division of application No. 15/458,985, filed on Mar. 15, 2017, now Pat. No. 10,568,105, which is a
(Continued)

(30) Foreign Application Priority Data

Oct. 23, 2014 (CN) .......................... 2014 1 0570839

(51) Int. Cl.
*H04W 72/08* (2009.01)
*H04W 88/04* (2009.01)
(Continued)

(52) U.S. Cl.
CPC ............ *H04W 72/08* (2013.01); *H04B 7/155* (2013.01); *H04L 5/006* (2013.01); *H04W 48/16* (2013.01);
(Continued)

(58) Field of Classification Search
CPC ... H04W 48/16; H04W 72/042; H04W 72/08; H04W 88/02; H04W 88/04; H04W 88/08;
(Continued)

(56) References Cited

U.S. PATENT DOCUMENTS

2010/0167743 A1* 7/2010 Palanki ................. H04W 72/02
455/436
2012/0063369 A1* 3/2012 Lin ....................... H04W 72/082
370/279
(Continued)

FOREIGN PATENT DOCUMENTS

WO 2011153507 A2 12/2011

*Primary Examiner* — Saad A. Waqas
(74) *Attorney, Agent, or Firm* — ScienBiziP, P.C.

(57) ABSTRACT

The present disclosure provides an auxiliary communication method and system, a device having base station function and a terminal. The auxiliary communication method includes: determining whether it is needed to provide auxiliary communication for any terminal according to channel quality of communication channels with the any terminal and data transmission requirement of the any terminal; selecting a specified terminal which is connected to the device having the base station function as an auxiliary terminal for assisting communication of the any terminal, when it is determined that it is needed to provide auxiliary communication for the any terminal; communicating with
(Continued)

the any terminal through the auxiliary terminal. The present disclosure enables accurately to determine the terminal assisted in communication. Wasting communication sources and blind assistance are avoided. Higher channel quality of the terminal between the terminal and the base station and higher data transmission rate can be ensured.

10 Claims, 12 Drawing Sheets

Related U.S. Application Data continuation-in-part of application No. PCT/CN2014/095966, filed on Dec. 31, 2014.

(51) Int. Cl.
| | | |
|---|---|---|
| H04L 5/00 | (2006.01) | |
| H04B 7/155 | (2006.01) | |
| H04W 48/16 | (2009.01) | |
| H04W 72/04 | (2009.01) | |
| H04W 8/00 | (2009.01) | |
| H04W 88/02 | (2009.01) | |
| H04W 88/08 | (2009.01) | |

(52) U.S. Cl.
CPC ......... *H04W 72/042* (2013.01); *H04W 88/04* (2013.01); *H04W 8/005* (2013.01); *H04W 88/02* (2013.01); *H04W 88/08* (2013.01)

(58) Field of Classification Search
CPC ............. H04W 8/005; H04W 72/0406; H04W 72/0446; H04W 72/0453; H04W 48/08; H04L 2001/0097; H04L 5/006; H04B 7/155
See application file for complete search history.

(56) References Cited

U.S. PATENT DOCUMENTS

2015/0085818 A1\* 3/2015 Huang .................. H04L 5/0062
370/330
2017/0078863 A1\* 3/2017 Kim ...................... H04W 48/16

\* cited by examiner

AUXILIARY COMMUNICATION METHOD AND SYSTEM, AND DEVICE HAVING BASE STATION FUNCTION AND TERMINAL

CROSS-REFERENCE TO RELATED APPLICATIONS

This application is a division application of U.S. patent application entitled "AUXILIARY COMMUNICATION METHOD AND SYSTEM, AND DEVICE HAVING BASE STATION FUNCTION AND TERMINAL" with application Ser. No. 15/458,985, filed on Mar. 15, 2017, which is a national stage application of International Application No. PCT/CN2014/095966, filed on Dec. 31, 2014, which claims priority of Chinese Patent Application No. 2014/10570839.9 filed on Oct. 23, 2014, entitled "auxiliary communication method, auxiliary communication system, device having base station function and terminal" in the China National Intellectual Property Administration (CNIPA).

FIELD

The embodiments of the present disclosure relate to communication technology field, and specifically to an auxiliary communication method, an auxiliary communication system, a device having base station function and a terminal.

BACKGROUND

High-speed data transmission is one of important goals that wireless communication pursues all the time. In the standardization process of LTE (long term evolution), methods for improving a data transmission rate are proposed, such as CoMP (Coordinated Multi-point), CA (Carrier Aggregation), Relay and high-order modulation and the like. When a plurality of base stations are in conjunction with each other to use same time-frequency resources, CoMP provides services for users and via CoMP, mutual interferences becomes an effective signal that can be received and combined to increase data throughput of users. CA aggregates a plurality of carriers to improve data throughput by improving total bandwidth. The Relay technology is generally considered to expand coverage area, and the effect of improving the data throughput is also achieved at the same time. The high-order modulation uses higher order modulation schemes such as 256 QAM and the like and makes each symbol to carry more information bits, so as to enhance data throughput.

However, the CoMP technology generally requires an ideal return link between cooperative base stations to facilitate collaborative users to share information. The ideal return link is not existed in many practical scenes. The CA technology uses a bandwidth to change rate, however, the bandwidth is a scarce resource, and it does not always have spare and idle bandwidth to can be used. The Relay technology requires a special relay station. In a traditional relay technology, a relay station accesses a plurality of users, a return link (a link between a relay and a base station) is often a capacity bottleneck. The high-order modulation can be used when the channel conditions are good, for example, the receiving terminal is near and there is no obstacle.

In the future Ultra Density Network (UDN), transmission power of base stations is low and coverage range is small, small cells are intensively deployed in clusters. If a small cell occurs downtime, the UE (User Equipment) connected to the small cell needs to access other small cells and becomes an edge user. As shown in FIG. 1, UE 106 is connected to a base station 102, however, after the base station 102 is in downtime, the UE 106 is connected to a base station 104, at this time, the distance between the UE 106 to the base station 104 is long, the UE 106 becomes an edge user. In this scenario, the above mentioned techniques for improving the data transmission rate may not be available. For example, suitable CoMP transmission set cannot be found, or adjacent small cells cannot perform CoMP transmission because of a bad return link, there is no carrier resource for CA, there is no relay node in the area, because a distance between the small cell and the user is far, a channel condition is not enough to use the high-order modulation and so on, finally the UE 106 is unable to obtain high speed data service.

When the channel quality between a terminal and a base station is poor, how to ensure a better communication quality between the terminal and the base station is an urgent problem to be solved.

DETAILED DESCRIPTION

For clarity of illustration of objectives, features and advantages of the present disclosure, where appropriate, the above drawings combined with detailed description illustrate the embodiments of the present disclosure hereinafter. It may be appreciated that different embodiments and elements in the different embodiment of the present disclosure can be combined, when there is no complicit.

The embodiments described herein are for better understanding of the present disclosure, other embodiments can also be practiced. The description is not to be considered as limiting the scope of the embodiments described herein.

Figure 2:
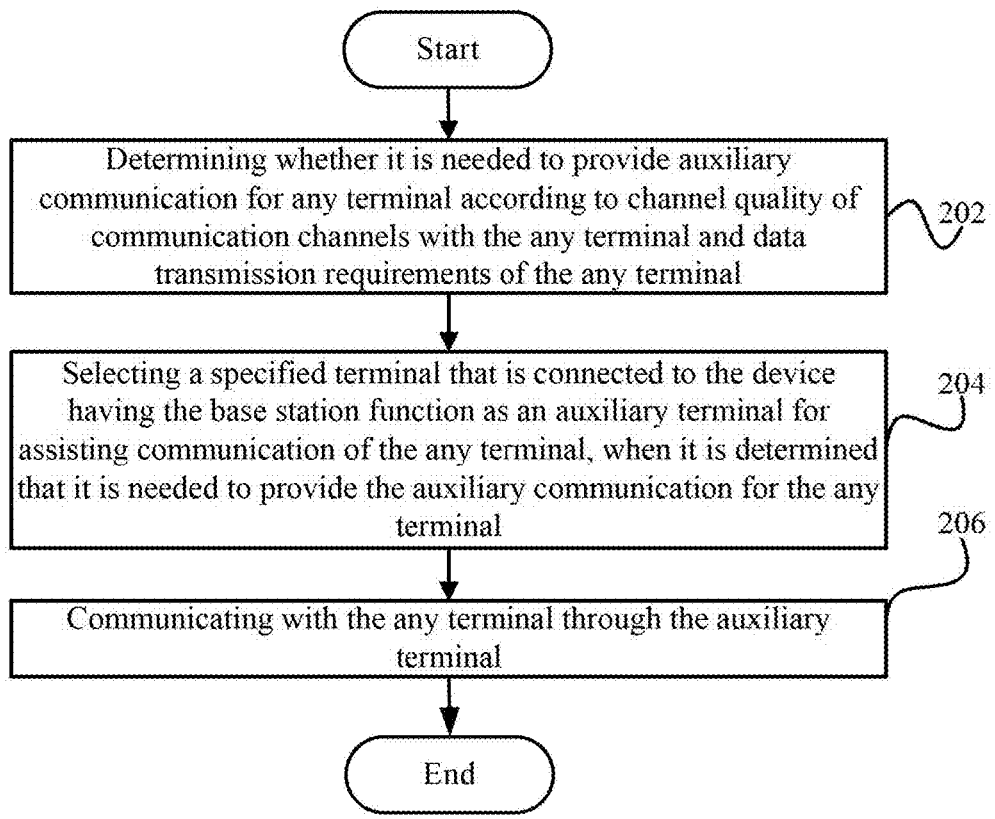
FIG. 2 shows a schematic flowchart of an auxiliary communication method applicable to a device having base station function according to embodiments of the present disclosure.

FIG. 2 shows a schematic flowchart of an auxiliary communication method applicable to a device having the base station function according to one embodiment of the present disclosure.

As shown in FIG. 2, according to embodiments of the present disclosure, the auxiliary communication method applicable to the device having the base station function includes: step 202, according to channel quality of communication channels with any terminal and data transmission requirements of the any terminal, determining whether it is needed to provide auxiliary communication for the any terminal; step 204, when it is determined that it is needed to provide the auxiliary communication for the any terminal, selecting a specified terminal that is connected to the device having the base station function as an auxiliary terminal for assisting communication of the any terminal, step 206, communicating with the any terminal through the auxiliary terminal.

In this embodiment, a terminal that needs auxiliary communication can be accurately determined by determining whether it is needed to provide auxiliary communication for the any terminal according to channel quality of communication channels with any terminal and data transmission requirement(s) of the any terminal. Blind assistance and wasting of communication resources, caused as the terminal has no data or has little data, can be avoided when the terminal is determined to need auxiliary communication only according to channel quality of communication channels with the terminal. At the same time, blind assistance and wasting of communication resources, caused as a higher channel quality between the auxiliary terminal and the device having the base station function can be avoided, when the auxiliary terminal is determined only according to the data transmission requirement(s) of the terminal.

When it is needed to provide auxiliary communication for the any terminal, the specified terminal is selected to be the auxiliary terminal for assisting communication of the any terminal. When channel quality is poor between the any terminal and the device having the base station function and much data needs to be transmitted, auxiliary communication is performed on another terminal which has better channel quality with the device having the base station function. Communication quality between the any terminal and the device having the base station function can be improved and higher data transmission rate of the any terminal can be ensured.

In the above embodiments, preferably, a step of determining whether it is needed to provide auxiliary communication for the any terminal includes: when a channel quality value of a downlink communication channel with the any terminal is less than or is equal to a first predetermined value, and an amount of data to be transmitted to the any terminal is more than or equal to a second predetermined value, determining that it is needed to provide downlink auxiliary communication for the any terminal is needed; and when a channel quality value of a uplink communication channel with the any terminal is less than or is equal to a third predetermined value, and an amount of data to be transmitted to the any terminal is more than or equal to a fourth predetermined value, determining that it is needed to provide uplink auxiliary communication for the any terminal is needed.

In this embodiment, when channel quality of a downlink communication channel with a terminal is less than or is equal to the first predetermined value, it is represented that quality of a downlink channel between the device having the base station function and the terminal is poor, and if an amount of data from the device having the base station function to be transmitted to the terminal is large, a data transmission rate between the device having the base station function and the terminal is improved through auxiliary communication. Similarly, quality of an uplink channel between the device having the base station function and the terminal is poor, and if the amount of data from the device having the base station function to be transmitted to the terminal is large, the data transmission rate between the device having the base station function and the terminal is improved through auxiliary communication.

In this embodiment, preferably, the auxiliary communication method applicable to the device having the base station function includes: determining the amount of data to be transmitted to the any terminal in a data buffer corresponding to the any terminal; and according to a buffer state report index transmitted by the any terminal in a media access control layer, determining the amount of data to be transmitted of the any terminal.

Ways of determining communication channel quality between the device having the base station function and the terminal includes: determining a channel quality value of the downlink communication channel according to channel quality measurement information reported by the any terminal; and determining channel quality value of the uplink communication channel according to uplink pilot information transmitted by the any terminal.

The specified terminal that provides auxiliary communication for another terminal needs to satisfy the following conditions: the specified terminal agrees to assist communication of the any terminal, channel quality between the specified terminal and the device having the base station function and channel quality between the specified terminal and the any terminal are both more than or equal to a fifth predetermined value. That is, the specified terminal agrees to assist the communication of the any terminal firstly, and secondly, channel quality between the specified terminal and the device having the base station function and channel quality between the specified terminal and the any terminal are better.

In the above embodiments, preferably, before the step of the auxiliary terminal communicating with the any terminal, the auxiliary communication method applicable to the device having the base station function includes: transmitting auxiliary communication information to the any terminal and the auxiliary terminal. The auxiliary communication information includes: a link direction of the auxiliary communication, spectrum information used by the any terminal to communicate with the auxiliary terminal, a time-frequency position of a discovery signal transmitted by the any terminal or the auxiliary terminal, scrambling sequence information used by the any terminal to communicate with the auxiliary terminal.

In this embodiment, by transmitting auxiliary communication information to the auxiliary terminal and a terminal assisted in communication, the auxiliary terminal and the terminal assisted in communication are able to determine the link direction of the auxiliary communication and determine each other by detecting the discovery signal at a specified time-frequency position. And while performing communication on spectrum resources specified by the device having the base station function, the scrambling sequence information of scrambling the communication information by both of the auxiliary terminal and a terminal assisted in communication can be determined.

In the above embodiment, preferably, after transmitting the auxiliary communication information to the any terminal and the auxiliary terminal, the auxiliary communication method applicable to the device having the base station function includes: if downlink auxiliary communication is determined to be needed to provide for the any terminal, when confirmation information that represents a connection to the any terminal is finished establishing transmitted by the auxiliary terminal is received, communicating with the any terminal through the auxiliary terminal; if uplink auxiliary communication is determined to be needed to provide for the any terminal, when confirmation information that represents a connection to the auxiliary terminal is finished establishing transmitted by the any terminal is received, communicating with the any terminal through the auxiliary terminal.

In this embodiment, when it is needed to provide the downlink auxiliary communication for the terminal, the device having the base station function notifies the terminal assisted in communication to detect the discovery signal transmitted by the auxiliary terminal. When the terminal assisted in communication detects the discovery signal transmitted by the auxiliary terminal, feedback information is transmitted to the auxiliary terminal. When the auxiliary terminal receives the feedback information transmitted by the terminal assisted in communication, the auxiliary terminal determines that a connection to the terminal assisted in communication is finished establishing, and information of finishing establishing the connection is transmitted to the device having the base station function. When the device having the base station function receives the information of finishing establishing the connection transmitted by the auxiliary terminal, the device having the base station function determines to start performing auxiliary communication. Similarly, when it is needed to provide the uplink auxiliary communication for the terminal, the device having the base station function notifies the auxiliary terminal to detect the discovery signal transmitted by the terminal assisted in communication. When the auxiliary terminal detects the discovery signal transmitted by the terminal assisted in communication, feedback information is transmitted to the terminal assisted in communication. When the terminal assisted in communication receives the feedback information transmitted by the auxiliary terminal, the terminal assisted in communication determines that a connection to the auxiliary terminal is finished establishing, and information of finishing establishing the connection is transmitted to the device having the base station function. When the device having the base station function receives the information of finishing establishing the connection transmitted by the terminal assisted in communication, the device having the base station function determines to start performing the auxiliary communication.

The word "unit" as used hereinafter, refers to logic embodied in hardware or firmware, or to a collection of software instructions, written in a programming language, such as, for example, Java, C, or assembly. One or more software instructions in the function units may be embedded in firmware (e.g., an auxiliary communication device applicable to a device having a base station function 300, an auxiliary communication device applicable to a terminal 600, an auxiliary communication device applicable to a terminal 700). It will be appreciated that the function units may include connected logic units, such as gates and flip-flops, and may include programmable units, such as programmable gate arrays or processors. The function units described herein may be implemented as either software and/or hardware units and may be stored in a storage device. The storage device can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example. The function units, when controlled by a processor, can execute the functions as mentioned above or as follows.

Figure 3:
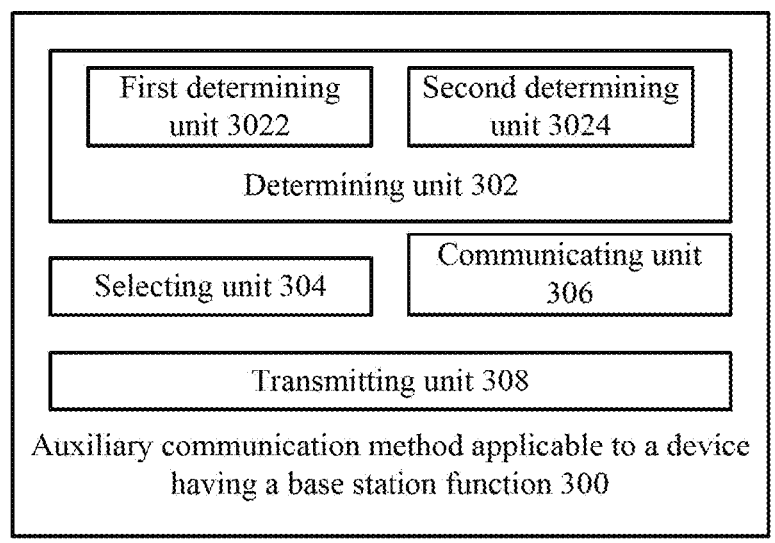
FIG. 3 shows a schematic structure diagram of an auxiliary communication system applicable to the device having the base station function according to embodiments of the present disclosure.

FIG. 3 shows a schematic structure diagram of an auxiliary communication system applicable to the device having the base station function according to embodiments of the present disclosure.

As shown in FIG. 3, according to embodiments of the present disclosure, the auxiliary communication system applicable to the device having the base station function 300 includes: a determining unit 302, which is configured to determine whether it is needed to provide auxiliary communication for any terminal according to channel quality of communication channels with the any terminal and data transmission requirements of the any terminal; a selecting unit 304, which is configured to select a specified terminal that is connected to the device having the base station function as an auxiliary terminal for assisting communication of the any terminal, when it is determined that it is needed to provide the auxiliary communication for the any terminal; a communicating unit 306, which is configured to communicate with the any terminal through the auxiliary terminal.

In this embodiment, a terminal that needs auxiliary communication can be accurately determined by determining whether it is needed to provide auxiliary communication for the any terminal according to channel quality of communication channels with any terminal and data transmission requirement(s) of the any terminal. Blind assistance and wasting of communication resources, caused as the terminal has no data or has little data, can be avoided when the terminal is determined to need auxiliary communication only according to channel quality of communication channels with the terminal. At the same time, Blind assistance and wasting of communication resources, caused as a higher channel quality between the auxiliary terminal and the device having the base station function can be avoided, when the auxiliary terminal is determined only according to the data transmission requirement(s) of the terminal.

When it is needed to provide auxiliary communication for the any terminal, the specified terminal is selected to be the auxiliary terminal for assisting communication of the any terminal. When channel quality is poor between the any terminal and the device having the base station function and much data needs to be transmitted, auxiliary communication is performed on another terminal which has better channel quality with the device having the base station function. Communication quality between the any terminal and the device having the base station function can be improved and higher data transmission rate of the any terminal can be ensured.

In the above embodiments, preferably, the determining unit 302 is specifically configured to: determine that it is needed to provide downlink auxiliary communication for the any terminal when a channel quality value of a downlink communication channel with the any terminal is less than or is equal to a first predetermined value, and an amount of data to be transmitted to the any terminal is more than or equal to a second predetermined value; and determine that it is needed to provide uplink auxiliary communication for the any terminal when a channel quality value of a uplink communication channel with the any terminal is less than or is equal to a third predetermined value, and an amount of data to be transmitted to the any terminal is more than or equal to a fourth predetermined value.

In this embodiment, when channel quality of a downlink communication channel with a terminal is less than or is equal to the first predetermined value, it is represented that quality of a downlink channel between the device having the base station function and the terminal is poor, and if an amount of data from the device having the base station function to be transmitted to the terminal is large, a data transmission rate between the device having the base station function and the terminal is improved through auxiliary communication. Similarly, quality of an uplink channel between the device having the base station function and the terminal is poor, and if the amount of data from the device having the base station function to be transmitted to the terminal is large, the data transmission rate between the device having the base station function and the terminal is improved through auxiliary communication.

In the above embodiments, preferably, the determining unit 302 includes: a first determining unit 3022, which is configured to determine the amount of data to be transmitted to the any terminal in a data buffer corresponding to the any terminal; and determine the amount of data to be transmitted of the any terminal according to a buffer state report index transmitted by the any terminal in a media access control layer.

In the above embodiments, preferably, the determining unit 302 includes: a second determining unit 3024, which is configured to determine a channel quality value of the downlink communication channel according to channel quality measurement information reported by the any terminal; and determine channel quality value of the uplink communication channel according to uplink pilot information transmitted by the any terminal.

The specified terminal that provides auxiliary communication for another terminal needs to satisfy the following conditions: the specified terminal agrees to assist communication of the any terminal, channel quality between the specified terminal and the device having the base station function and channel quality between the specified terminal and the any terminal are both more than or equal to a fifth predetermined value. That is, the specified terminal agrees to assist the communication of the any terminal firstly, and secondly, channel quality between the specified terminal and the device having the base station function and channel quality between the specified terminal and the any terminal are better.

In the above embodiments, preferably, the auxiliary communication system applicable to the device having the base station function 300 includes: a transmitting unit 308, which is configured to transmit auxiliary communication information to the any terminal and the auxiliary terminal before the auxiliary terminal communicating with the any terminal, wherein the auxiliary communication information includes: a link direction of the auxiliary communication, spectrum information used by the any terminal to communicate with the auxiliary terminal, a time-frequency position of a discovery signal transmitted by the any terminal or the auxiliary terminal, scrambling sequence information used by the any terminal to communicate with the auxiliary terminal.

In this embodiment, by transmitting auxiliary communication information to the auxiliary terminal and a terminal assisted in communication, the auxiliary terminal and the terminal assisted in communication are able to determine the link direction of the auxiliary communication and determine each other by detecting the discovery signal at a specified time-frequency position. And while performing communication on spectrum resources specified by the device having the base station function, the scrambling sequence information of scrambling the communication information by both of the auxiliary terminal and a terminal assisted in communication can be determined.

In the above embodiment, preferably, the communicating unit 306 is specially configured to: communicate with the any terminal through the auxiliary terminal when confirmation information that represents a connection to the any terminal is finished establishing transmitted by the auxiliary terminal is received, if downlink auxiliary communication is determined to be needed to provide for the any terminal, and communicate with the any terminal through the auxiliary terminal when confirmation information that represents a connection to the auxiliary terminal is finished establishing transmitted by the any terminal is received, if uplink auxiliary communication is determined to be needed to provide for the any terminal.

In this embodiment, when it is needed to provide the downlink auxiliary communication for the terminal, the device having the base station function notifies the terminal assisted in communication to detect the discovery signal transmitted by the auxiliary terminal. When the terminal assisted in communication detects the discovery signal transmitted by the auxiliary terminal, feedback information is transmitted to the auxiliary terminal. When the auxiliary terminal receives the feedback information transmitted by the terminal assisted in communication, the auxiliary terminal determines that a connection to the terminal assisted in communication is finished establishing, and information of finishing establishing the connection is transmitted to the device having the base station function. When the device having the base station function receives the information of finishing establishing the connection transmitted by the auxiliary terminal, the device having the base station function determines to start performing auxiliary communication. Similarly, when it is needed to provide the uplink auxiliary communication for the terminal, the device having the base station function notifies the auxiliary terminal to detect the discovery signal transmitted by the terminal assisted in communication. When the auxiliary terminal detects the discovery signal transmitted by the terminal assisted in communication, feedback information is transmitted to the terminal assisted in communication.

When the terminal assisted in communication receives the feedback information transmitted by the auxiliary terminal, the terminal assisted in communication determines that a connection to the auxiliary terminal is finished establishing, and information of finishing establishing the connection is transmitted to the device having the base station function. When the device having the base station function receives the information of finishing establishing the connection transmitted by the terminal assisted in communication, the device having the base station function determines to start performing the auxiliary communication.

The auxiliary communication system applicable to a device having a base station function 300 can be a firmware, which may be installed in the device having the base station function (e.g., shown in FIG. 10), which includes at least one processor and a storage device. The determining unit 302, the selecting unit 304, the communicating unit 306, the transmitting unit 308, and other modules or submodules as described above, include computerized instructions in the form of one or more computer-readable programs that can be stored in the storage device of the terminal, and can be implemented by the at least one processor.

Figure 10:
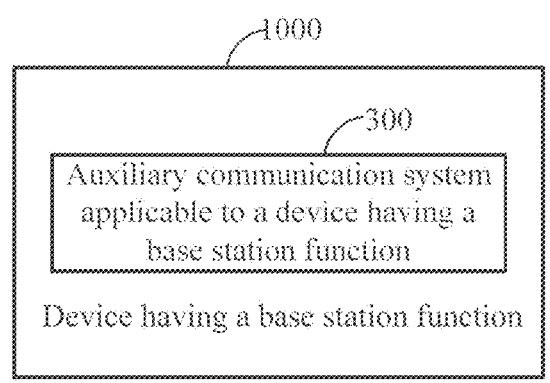
FIG. 10 shows a schematic diagram of one embodiment of a device having a base station function according to the present disclosure.

The present disclosure further proposes a device having a base station function (as shown in FIG. 10), the device having a base station function includes: an auxiliary communication system applicable to the device having the base station function 300 shown in FIG. 3. As shown in FIG. 10, according to one embodiment of the present disclosure, the device having the base station function 1000 includes the auxiliary communication device applicable the device having the base station function 300. The device having the base station function 1000 further includes at least one processor and a storage device, which are not shown in FIG. 10. FIG. 10 illustrates only one example of the device having the base station function 1000 that may include more or fewer components than illustrated, or have a different configuration of the various components.

Figure 4:
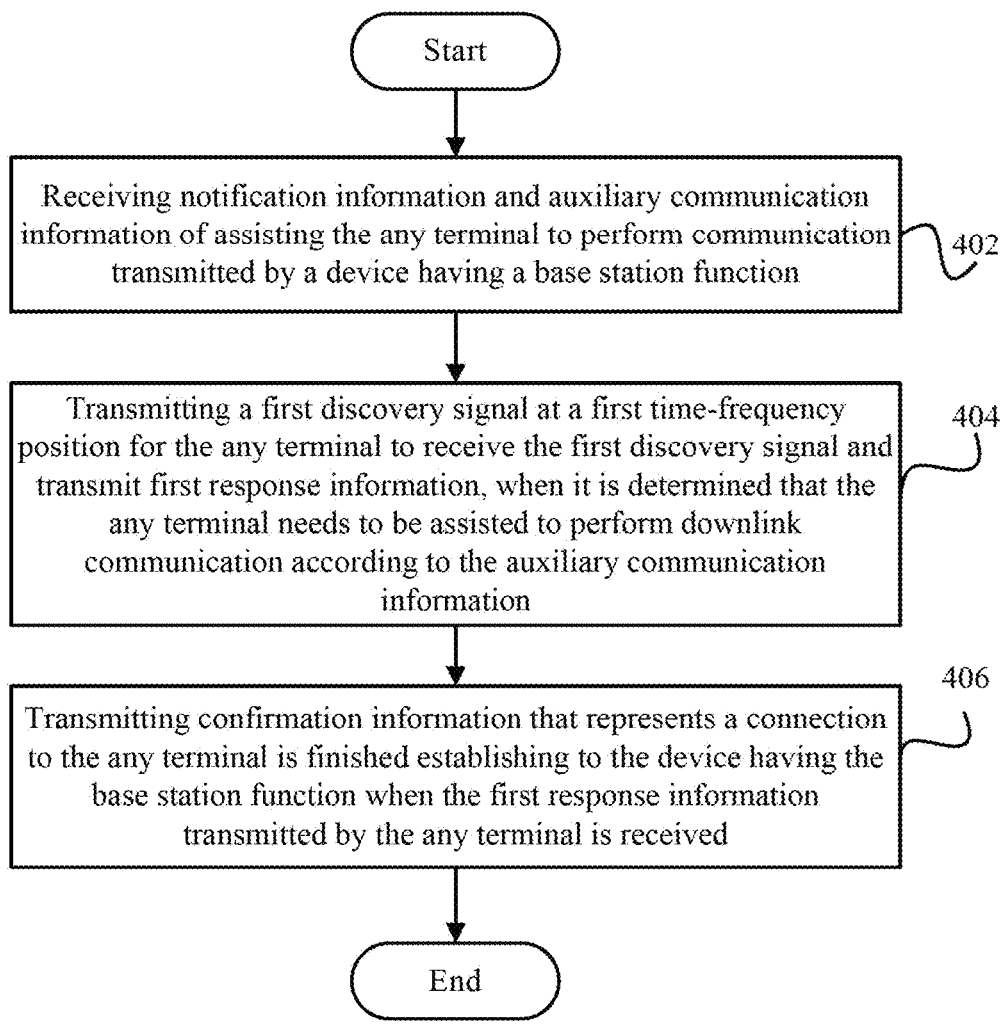
FIG. 4 shows a schematic flowchart of an auxiliary communication method applicable to a terminal according to one embodiment of the present disclosure.

According to one embodiment of the present disclosure, FIG. 4 shows a schematic flowchart of an auxiliary communication method applicable to a terminal.

As shown in FIG. 4, according to one embodiment of the present disclosure, the auxiliary communication method applicable to the terminal includes: step 402, receiving notification information and auxiliary communication information of assisting the any terminal to perform communication transmitted by the device having the base station function; step 404, when it is determined that the any terminal needs to be assisted to perform downlink communication according to the auxiliary communication information, transmitting a first discovery signal at a first time-frequency position for the any terminal to receive the first discovery signal and transmit first response information; step 406, when the first response information transmitted by the any terminal is received, transmitting confirmation information that represents a connection to the any terminal is finished establishing to the device having the base station function.

In this embodiment, when (the auxiliary terminal) receives the notification information of auxiliary communication transmitted by the device having the base station, the auxiliary terminal transmits the discovery signal at the first time-frequency position, so that the terminal assisted in communication can detect the discovery signal, and then establish the connection to the auxiliary terminal to realize a purpose of the auxiliary communication.

In this embodiment, preferably, the auxiliary communication method applicable to the terminal further includes: when it is determined that the any terminal needs to be assisted to perform uplink communication according to the auxiliary communication information, receiving a second discovery signal at a second time-frequency position transmitted by the any terminal, and transmitting second response information to the any terminal.

In this embodiment, when (the auxiliary terminal) determines that another terminal needs to be assisted in uplink communication, since the another terminal can transmit the discovery signal, the terminal assisted in communication is determined by detecting the discovery signal transmitted by the another terminal, and a connection to the terminal assisted in communication is established to realize a purpose of the auxiliary communication.

In this embodiment, preferably, the auxiliary communication method applicable to the terminal further includes: receiving first communication data transmitted by the device having the base station function when the any terminal needs to be assisted to perform the downlink communication, transmitting the first communication data to the any terminal after performing power amplification on the first communication data, or demodulating the first communication data and transmitting the first demodulated data to the any terminal after modulating the first demodulated data according to channel quality with the any terminal; and when the any terminal needs to be assisted to perform the uplink communication, receiving second communication data transmitted by the any terminal, and transmitting the processed data to the device having the base station function after performing power amplification on the second communication data, or demodulating the second communication data and transmitting the modulated data to the device having the base station function after modulating the second demodulated data according to channel quality with the device having the base station function.

A method for determining the first time-frequency position and the second time-frequency position includes following two ways:

In a first way: a time-frequency position of the first discovery signal notified in the auxiliary communication information is determined as the first time-frequency position, and/or a time-frequency position of the second discovery signal notified in the auxiliary communication information is determined as the second time-frequency position;

In a second way: a specified time-frequency position in predetermined time-frequency sources is selected as the first time-frequency position and/or the second time-frequency position.

In this embodiment, preferably, before transmitting the first discovery signal, the auxiliary communication method applicable to the terminal further includes: scrambling the first discovery signal through scrambling sequences in the auxiliary communication information.

In this embodiment, according to the scrambling sequences in the auxiliary communication information, the first discovery signal is scrambled, and only the terminal assisted in communication knows the scrambling sequences. It can be ensured that only the terminal assisted in communication is enabled to acquire the first discovery. It is avoided that the first discovery signal is received by another terminal and is fed back so that the auxiliary terminal cannot accurately determines the terminal assisted in communication.

Figure 5:
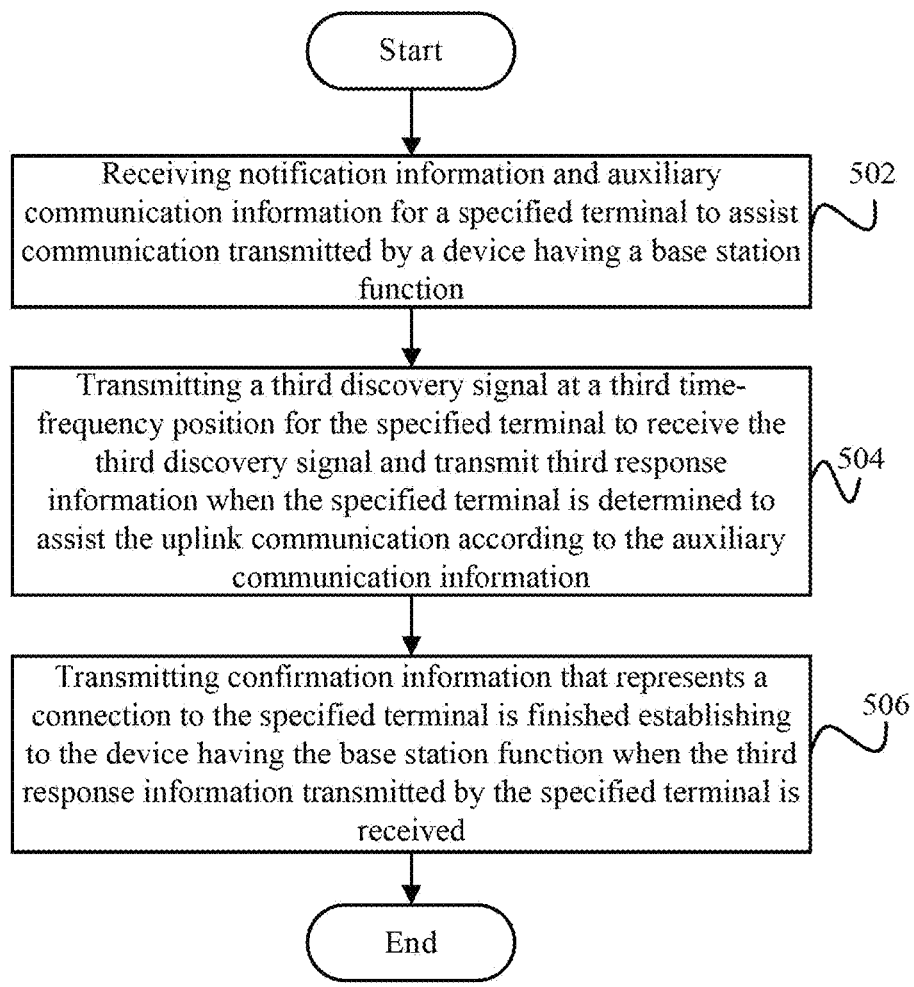
FIG. 5 shows a schematic flowchart of an auxiliary communication method applicable to the terminal according to one embodiment of the present disclosure.

According to another embodiment of the present disclosure, FIG. 5 shows a schematic flowchart of an auxiliary communication method applicable to the terminal.

As shown in FIG. 5, according to another embodiment of the present disclosure, the auxiliary communication method applicable to the terminal includes: step 502, receiving notification information and auxiliary communication information transmitted by the device having the base station function, for a specified terminal to assist communication; step 504, when the specified terminal is determined to assist the uplink communication according to the auxiliary communication information, transmitting a third discovery signal at a third time-frequency position for the specified terminal to receive the third discovery signal and transmits third response information; step 506, when the third response information transmitted by the specified terminal is received, transmitting confirmation information that represents a connection to the specified terminal is finished establishing to the device having the base station function.

In this embodiment, when (the terminal assisted in communication) receives the notification information of auxiliary communication transmitted by the device having the base station function, a discovery signal is transmitted at the third time-frequency position, so that the auxiliary terminal can detect the discovery signal and the auxiliary terminal can establish a connection to the terminal assisted in communication to realize a purpose of the auxiliary communication.

In the above embodiments, preferably, the auxiliary communication method applicable to the terminal further includes: when the specified terminal is determined to assist the downlink communication according to the auxiliary communication information, receiving a fourth discovery signal transmitted by the specified terminal at a fourth time-frequency position and transmitting fourth response information to the specified terminal.

In this embodiment, when (the terminal assisted in communication) determines that it is needed to be assisted to perform uplink communication by another terminal, since the auxiliary terminal transmits the discovery signal, the auxiliary terminal is determined by detecting the discovery signal transmitted by another terminal, and a connection to the auxiliary terminal is established to realize a purpose of the auxiliary communication.

Figure 6:
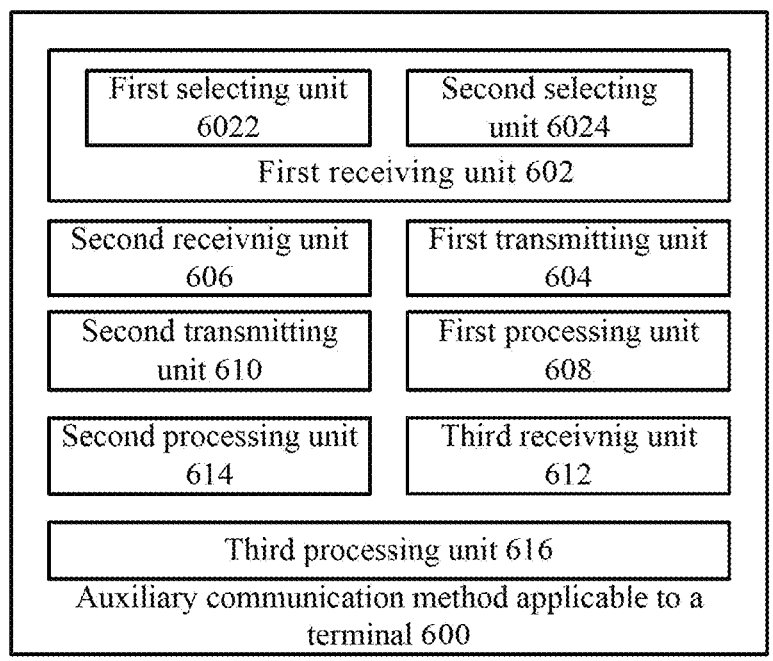
FIG. 6 shows a schematic structure diagram of an auxiliary communication system applicable to the terminal according to one embodiment of the present disclosure.

FIG. 6 shows a schematic structure diagram of an auxiliary communication system applicable to the terminal according to one embodiment of the present disclosure.

As shown in FIG. 6, according to one embodiment of the present disclosure, the auxiliary communication system applicable to the terminal 600 includes: a first receiving unit 602, which is configured to receive notification information and auxiliary communication information of assisting the any terminal to perform communication transmitted by a device having a base station function, and configured to receive a first response information transmitted by the any terminal; a first transmitting unit 604, which is configured to transmit a first discovery signal at a first time-frequency position for the any terminal to receive the first discovery signal and transmit first response information, when it is determined that the any terminal needs to be assisted to perform downlink communication according to the auxiliary communication information; and configured to transmit confirmation information that represents a connection to the any terminal is finished establishing to the device having the base station function when the first receiving unit 602 receives the first response information transmitted by the any terminal.

In this embodiment, when (the auxiliary terminal) receives the notification information of auxiliary communication transmitted by the device having the base station, the auxiliary terminal transmits the discovery signal at the first time-frequency position, so that the terminal assisted in communication can detect the discovery signal, and then establish the connection to the auxiliary terminal to realize a purpose of the auxiliary communication.

In this embodiment, preferably, the first receiving unit 602 is further configured to: receive a second discovery signal transmitted by the any terminal at a second time-frequency position when it is determined that the any terminal needs to be assisted to perform uplink communication according to the auxiliary communication information; the first transmitting unit 604 is further configured to transmit second response information to the any terminal when the first receiving unit 602 receives the second discovery signal.

In this embodiment, when (the auxiliary terminal) determines that another terminal needs to be assisted in uplink communication, since the another terminal can transmit the discovery signal, the terminal assisted in communication is determined by detecting the discovery signal transmitted by the another terminal, and a connection to the terminal assisted in communication is established to realize a purpose of the auxiliary communication.

In the above embodiments, preferably, the auxiliary communication system applicable to the terminal 600 further includes: a second receiving unit 606, which is configured to receive first communication data transmitted by the device having the base station function when the any terminal needs to be assisted to perform the downlink communication; a first processing unit 608, which is configured to perform power amplification on the first communication data, acquire processed data, or configured to demodulate the first communication data and acquire first demodulated data, modulate the first demodulated data according to channel quality with the any terminal; and a second transmitting unit 610, which is configured to transmit the first communication data to the any terminal after the first processing unit 608 performs the power amplification on the first communication data or transmit the first demodulated data to the any terminal after the first processing unit 608 modulates the first demodulated data; and a third receiving unit 612, which is configured to receive second communication data transmitted by the any terminal when the any terminal needs to be assisted to perform the uplink communication; a second processing unit 614, which is configured to perform power amplification on the second communication data, or configured to demodulate the second communication data and acquire second demodulated data, modulate the second demodulated data according to channel quality with the device having the base station function; a third transmitting unit 616, which is configured to transmit the second communication data to the device having the base station function after the second processing unit 614 performs power amplification on the second communication data or transmit the second demodulated data after the second processing unit 614 modulates the second demodulated data to the device having the base station function.

In the above embodiments, preferably, the first receiving unit 602 includes: a first selecting unit 6022, which is configured to determine a time-frequency position of the first discovery signal notified in the auxiliary communication information as the first time-frequency position, and/or determine a time-frequency position of the second discovery signal notified in the auxiliary communication information as the second time-frequency position; or a second selecting unit 6024, which is configured to select a specified time-frequency position in predetermined time-frequency sources as the first time-frequency position and/or the second time-frequency position.

In the above embodiments, preferably, the auxiliary communication system applicable to the terminal 600 further includes: a third processing unit 616, which is configured to scramble the first discovery signal through scrambling sequences in the auxiliary communication information before transmitting the first discovery signal.

In this embodiment, according to the scrambling sequences in the auxiliary communication information, the first discovery signal is scrambled, and only the terminal assisted in communication knows the scrambling sequences. It can be ensured that only the terminal assisted in communication is enabled to acquire the first discovery. It is avoided that the first discovery signal is received by another terminal and is fed back so that the auxiliary terminal cannot accurately determines the terminal assisted in communication.

The auxiliary communication system applicable to a terminal 600 can be a firmware, which may be installed in the terminal (e.g., shown in FIG. 11), which includes at least one processor and a storage device. The first receiving unit 602, the first transmitting unit 604, the second receiving unit 606, the first processing unit 608, the second transmitting unit 610, the third receiving unit 612, the second processing unit 614 and other modules or submodules as described above, include computerized instructions in the form of one or more computer-readable programs that can be stored in the storage device of the terminal, and can be implemented by the at least one processor.

Figure 11:
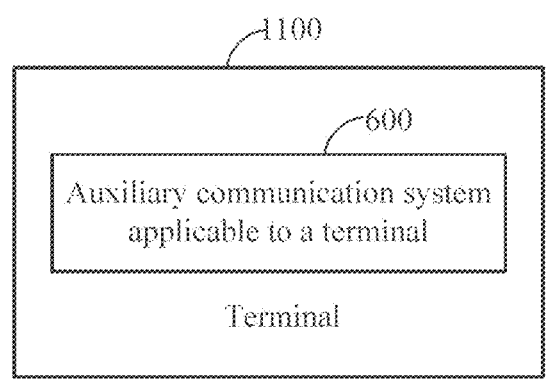
FIG. 11 shows a schematic diagram of one embodiment of a terminal according to the present disclosure.

The present disclosure further proposes the terminal (as shown in FIG. 11), includes: an auxiliary communication system applicable to a terminal 600 shown in FIG. 6 As shown in FIG. 11, according to one embodiment of the present disclosure, the terminal 1100 includes the auxiliary communication system applicable to a terminal 600. The terminal 1100 further includes at least one processor and a storage device, which are not shown in FIG. 11. FIG. 11 illustrates only one example of the terminal 1100 that may include more or fewer components than illustrated, or have a different configuration of the various components.

Figure 7:
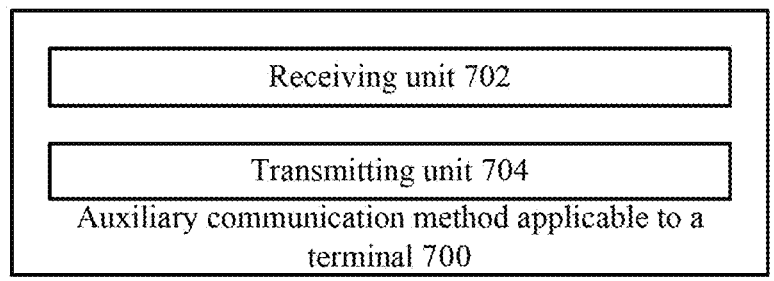
FIG. 7 shows a schematic structure diagram of an auxiliary communication system applicable to the terminal according to one embodiment of the present disclosure.

FIG. 7 shows a schematic structure diagram of an auxiliary communication system applicable to a terminal according to one embodiment of the present disclosure.

As shown in FIG. 7, an auxiliary communication system applicable to the terminal 700 includes: a receiving unit 702, which is configured to receive notification information and auxiliary communication information for a specified terminal to assist communication transmitted by a device having a base station function; a transmitting unit 704, which is configured to transmit a third discovery signal at a third time-frequency position for the specified terminal to receive the third discovery signal and transmit third response information when the specified terminal is determined to assist the uplink communication according to the auxiliary communication information; and configured to transmit confirmation information that represents a connection to the specified terminal is finished establishing to the device having the base station function when the receiving unit 702 receives the third response information transmitted by the specified terminal.

In this embodiment, when (the terminal assisted in communication) receives the notification information of auxiliary communication transmitted by the device having the base station function, a discovery signal is transmitted at the third time-frequency position, so that the auxiliary terminal can detect the discovery signal and the auxiliary terminal can establish a connection to the terminal assisted in communication to realize a purpose of the auxiliary communication.

In the above embodiments, preferably, the receiving unit 702 is further configured to: receive a fourth discovery signal transmitted by the specified terminal at a fourth time-frequency position when the specified terminal is determined to assist the downlink communication according to the auxiliary communication information; the transmitting unit 704 is configured to transmit fourth response information when the receiving unit 702 receives the fourth discovery signal.

In this embodiment, when (the terminal assisted in communication) determines that it is needed to be assisted to perform uplink communication by another terminal, since the auxiliary terminal transmits the discovery signal, the auxiliary terminal is determined by detecting the discovery signal transmitted by another terminal, and a connection to the auxiliary terminal is established to realize a purpose of the auxiliary communication.

The auxiliary communication device applicable to a terminal 700 can be a firmware, which may be installed in the terminal (e.g., shown in FIG. 12), which includes at least one processor and a storage device. The receiving unit 702, the transmitting unit 704 and other modules or submodules as described above, include computerized instructions in the form of one or more computer-readable programs that can be stored in the storage device of the terminal, and can be implemented by the at least one processor.

Figure 12:
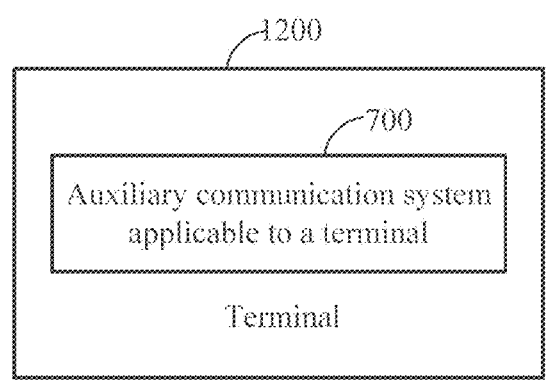
FIG. 12 shows a schematic diagram of one embodiment of a terminal according to the present disclosure.

The present disclosure further proposes the terminal (as shown in FIG. 12), includes: an auxiliary communication system applicable to a terminal 700 shown in FIG. 7 As shown in FIG. 12, according to one embodiment of the present disclosure, the terminal 1200 includes the auxiliary communication device applicable to a terminal 700. The terminal 1200 further includes at least one processor and a storage device, which are not shown in FIG. 12. FIG. 12 illustrates only one example of the terminal 1200 that may include more or fewer components than illustrated, or have a different configuration of the various components.

The present disclosure further proposes a terminal (as shown in FIG. 11 or as shown in FIG. 12), the terminal includes: an auxiliary communication system applicable to the terminal 600 shown in FIG. 6, and/or an auxiliary communication system applicable to the terminal 700 shown in FIG. 7.

Combined with FIG. 0.8, the technical solutions of the present disclosure are described in detail below.

Figure 1:
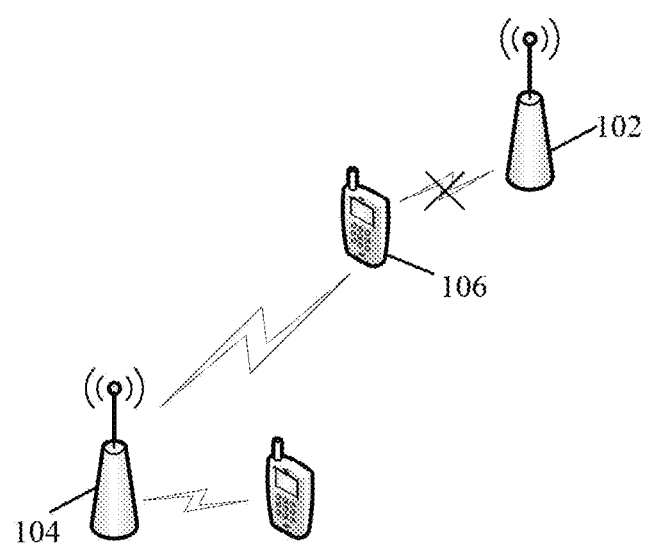
FIG. 1 shows a schematic diagram of a communication scenario in related technique.
Figure 8:
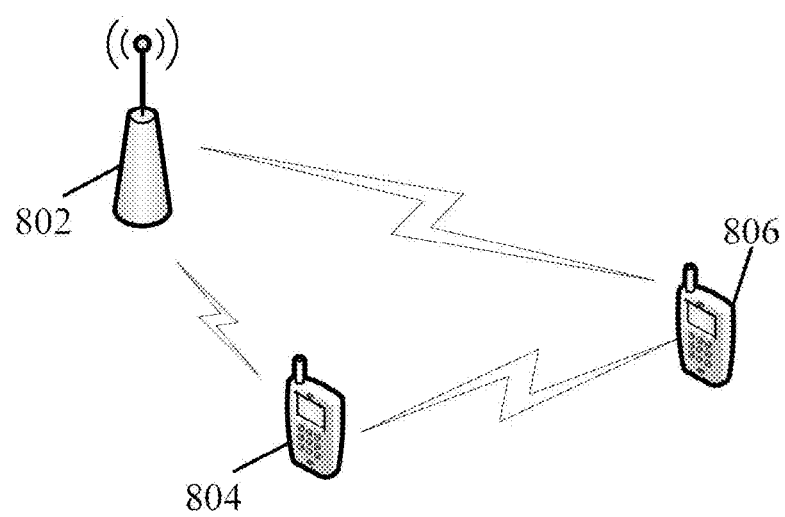
FIG. 8 shows a schematic diagram of a communication scenario according to one embodiment of the present disclosure.

In order to solve problems existing in the scene shown in FIG. 1, that is, after a base station 102 is downtime, a UE 106 is connected to a base station 104, at this point, the UE 106 is farther from the base station 104, the UE 106 becomes an edge user so that the UE 106 cannot obtain a high-speed data service. As shown in FIG. 8, the present disclosure proposes that a base station 802 looks for an auxiliary terminal 804 for a terminal 806 with poorer channel conditions and higher data transmission requirements, the auxiliary terminal 804 forwards data for the terminal 806 to maintain a higher data transmission rate.

The technical solutions of the present disclosure are described in detail below.

1. A base station determines whether it is needed to provide auxiliary communication for a terminal, in detail, the base station determines whether a communication user (hereinafter referred to as UE1) has poor channel quality and high data transmission requirement on the uplink/downlink. Methods for determining whether the communication user has poor channel quality by the base station includes:

(1) according to CQI (Channel Quality Indicator) reported by the UE1, the base station determines whether channel quality of a downlink channel of the UE1 is poor;

(2) according to uplink pilot transmitted by the UE1, the base station determines whether channel quality of an uplink channel of the UE1 is poor.

Methods for determining whether the communication user has high data transmission requirement by the base station includes:

(1) The base station determines the whether the UE1 has high data transmission requirement(s) on the uplink direction by directly checking the amount of data to be transmitted in a data buffer in the base station and QoS (Quality of Service) corresponding to the data;

(2) The base station determines whether the UE1 has the high data transmission requirement(s) on the downlink direction according to BSR index (buffer state report index) of MAC (Media Access Control) transmitted by the UE.

2. The base station determines whether a terminal auxiliary communication service is started for the UE1.

In detail, if the UE1 is in a state of having poor channel quality and high data transmission requirement on one link direction, the base station determines that the terminal auxiliary communication service can be started for the UE1. If the UE1 is not in a state of having poor channel quality and high data transmission requirement on an arbitrarily link direction, the base station determines that the terminal auxiliary communication service cannot be started for the UE1. It should be noted that the terminal auxiliary communication service can only be started on one link direction, for example, the auxiliary communication service is only started for the UE1 on the downlink direction and not started on the uplink direction.

3. The base station selects an auxiliary communication terminal for the UE1.

In detail, according to position information of the UE1, the base station selects the auxiliary communication terminal for the UE1. The selected auxiliary communication terminal needs to satisfy following conditions:

(1) the auxiliary communication terminal is the service terminal of the base station;

(2) the auxiliary communication terminal needs to agree the auxiliary communication service;

(3) The position of the auxiliary communication terminal is appropriate, and the channel conditions with the UE1 and the base station are good. This condition can also be simplified, the position of the auxiliary communication terminal is determined by using a distance between the auxiliary communication terminal and UE1 and a distance between the auxiliary communication terminal and the base station, that is, when the distance between the auxiliary communication terminal and the UE1 and the distance between the auxiliary communication terminal and the base station are both closer, it can be considered that the position of the auxiliary communication terminal is appropriate.

4. Auxiliary communication is performed on the downlink direction.

(1) The base station selects the auxiliary communication terminal, and transmits auxiliary communication information to the auxiliary communication terminal (hereinafter referred to the UE2). The auxiliary communication information includes auxiliary communication link direction information, spectrum indication used by the UE1 to communicate with the UE2, time-frequency position indications of a discovery reference signal of the UE2, scrambling sequence indication used by the UE1 to communicate with the UE2, and the like.

More specifically, spectrums used by the UE1 to communicate with the UE2 can be predetermined spectrums. For example, the UE1 can communicate with the UE2 on predetermined D2D (Device-To-Device) spectrums. In this situation, the base station cannot notify the UE1 and the UE2 of the spectrum indications used to communicate, and the base station can flexibly allocate spectrum resources for the communication between the UE1 and the UE2. It should be noted that UE 1 and the UE 2 needs to support communication on the spectrums.

More specifically, the time-frequency position indication of the discovery reference signal is a time-frequency position indication of a discovery used by the UE2. Through the time-frequency position indication of the discovery reference signal, the UE2 transmits the discovery signal on a specified time-frequency resource. When the time-frequency position of the discovery signal is predetermined in a limited set, the base station can choose not to transmit the information, the UE2 selects a time-frequency position in the limited set to transmit the discovery signal and receives the discovery reference signal of an opposite terminal through blind detection.

More specifically, the scrambling sequence used by the UE1 to communicate with the UE2 is a scrambling sequence that is used to encrypt communication information between the UE1 and the UE2. The scrambling sequence can be a C-RNTI (Cell Radio Network Temporary Identifier) of the UE1 or the UE2, or can be a scrambling sequence which is allocated by the base station for the communication between the UE1 and the UE2 in a predetermined scrambling sequence set.

(2) While executing the step (1), the base station transmits the auxiliary communication information and notifies the UE1 to enter in a state of being assisted in communication. The auxiliary communication information includes the auxiliary communication link direction information, the spectrum indication used by the UE1 to communicate with the UE2, the time-frequency position indication of the discovery reference signal, the scrambling sequence indication used by the UE1 to communicate with the UE2, and the like.

More specifically, the time-frequency position indication of the discovery reference signal is a time-frequency position indication of the discovery signal used by the UE2, so that the UE1 receives and transmits the discovery reference signal on a specified time-frequency resource. When the time-frequency position of the discovery signal is predetermined in a limited set, the base station can choose not to transmit the information, the UE1 receives the discovery reference signal of an opposite terminal through blind detection.

(3) The UE2 transmits the discovery reference signal on a selected time-frequency position. The discovery reference signal is scrambled by using the specified scrambling sequence. The UE1 receives and descrambles the discovery reference signal of the UE2 on a specified time-frequency position or through blind detection.

(4) After the UE1 correctly receives the discovery reference signal of the UE2, the UE1 feeds back auxiliary communication response information to the UE2. The auxiliary communication response information includes channel quality status indication from the UE2 to the UE1. The channel quality can be determined according to the discovery reference signal of the UE2.

(5) After the UE2 receives the auxiliary communication response information, it is considered that a connection between the UE2 and the UE1 is established. The UE2 transmits information of finishing establishing the connection of the auxiliary communication, and are ready to receive downlink data transmitted by the base station.

(6) The base station transmits downlink data (the downlink data includes user data and control information, such as DCI, etc.) to the UE2. The UE2 can select the following ways of forwarding data of the UE1 to the UE1:

A. The UE2 transmits the processed data to the UE1 after performing power amplification on received data of the UE1, acquires processed data.

B. The UE2 modulates the received data of the UE1 again after demodulating the received data of the UE1 according to channel quality of the UE1, and transmits the received data of the UE1 to the UE1 after adding corresponding control information to received data of the UE1. In this way, the UE2 needs to acquire necessary information of demodulating data and modulating data again of the UE1, such as C-RNTI of UE1, etc.

5. Auxiliary communication is performed on the uplink direction.

A procedure of performing the auxiliary communication on the uplink direction is substantially the same as the process of performing the auxiliary communication on the downlink direction, there are only a few differences, which includes:

(1) In the first step or the second step of the fourth aspect, the base station respectively notifies the UE1 and the UE2 of the time-frequency position indications of the discovery reference signal.

(2) In the third step or the fourth step of the fourth aspect, the UE1 transmits the discovery reference signal, the UE2 receives and detects the discovery reference signal, and feeds back auxiliary communication response information to the UE1. The discovery reference signal includes a channel quality status indication from the UE1 to the UE2.

It Should Be Noted That:

(1) The above processes of uplink/downlink terminal auxiliary communication can be performed at the same time or separately. For example, the downlink of the UE1 performs high speed data transmission communication by being assisted by the UE2, and the uplink directly communicates with the base station.

(2) A terminal used for auxiliary communication needs to be a trusted user, and agrees auxiliary communication. The user may need to pre-contract for the operator and agree the auxiliary communication service. The operator needs to register the terminal that can perform auxiliary communication in the system, and may give some incentive compensation to auxiliary communication users.

Figure 9:
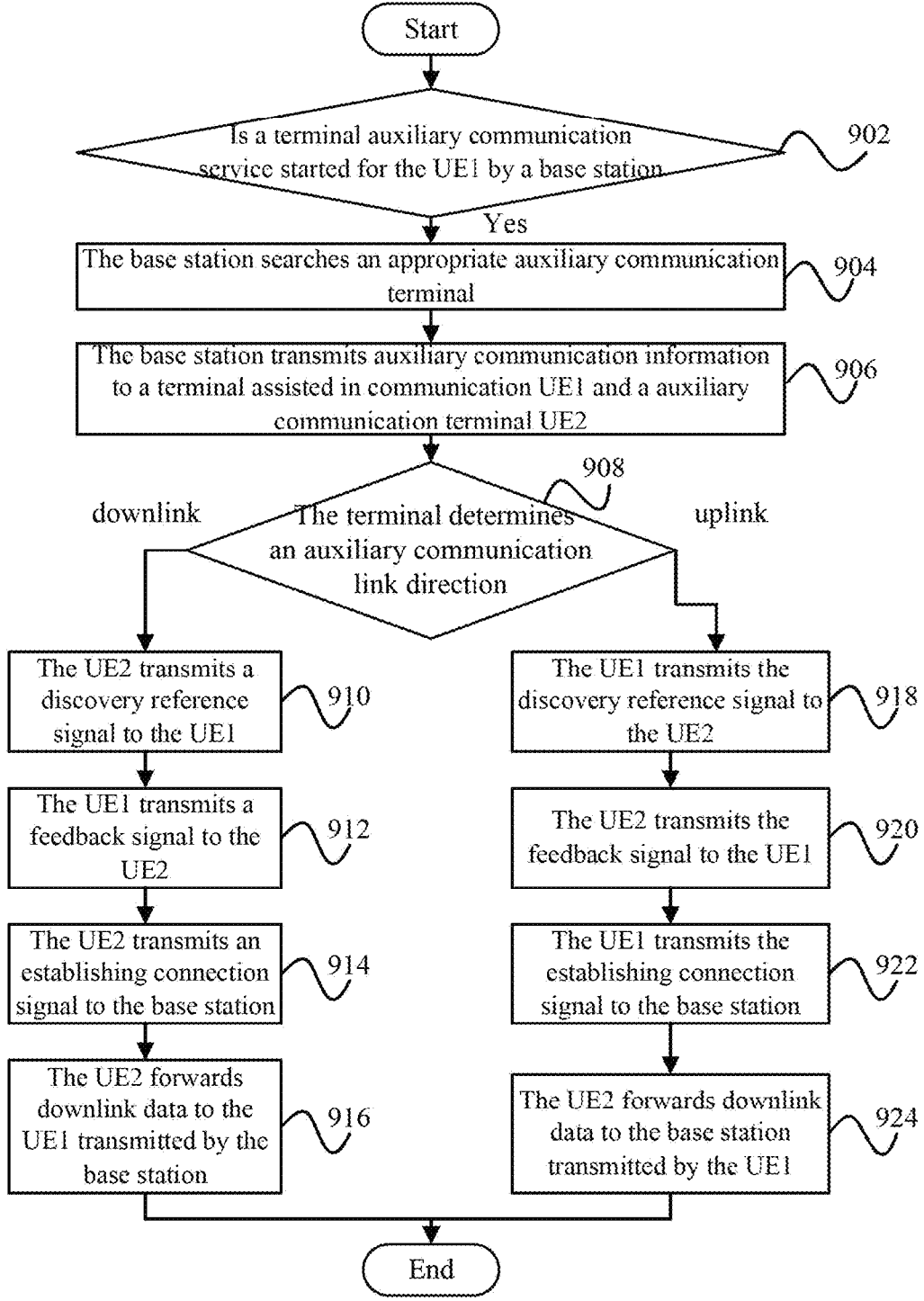
FIG. 9 shows a schematic flowchart of an auxiliary communication method according to one embodiment of the present disclosure.

The above process is shown in the FIG. 9:

As shown in FIG. 9, according to one embodiment of the present disclosure, the auxiliary communication method includes:

Step 902, the base station determines whether the terminal auxiliary communication service is started for the UE1, if is, step 904 is executed; otherwise, the procedure ends.

Step 904, the base station searches an appropriate auxiliary communication terminal.

Step 906, the base station transmits auxiliary communication information to the a terminal assisted in communication UE1 and the auxiliary communication terminal UE2.

Step 908, the terminal determines an auxiliary communication link direction, if the auxiliary communication link direction is the uplink auxiliary communication link, step 918 is executed; if the auxiliary communication link direction is the downlink auxiliary communication link, step 910 is executed.

Step 910, when the downlink auxiliary communication link is determined, the UE2 transmits a discovery reference signal to the UE1.

Step 912, the UE1 transmits a feedback signal to the UE2.

Step 914, the UE2 transmits an establishing connection signal to the base station.

Step 916, the UE2 forwards downlink data to the UE1 transmitted by the base station.

Step 918, when the uplink auxiliary communication link is determined, the UE1 transmits the discovery reference signal to the UE2.

Step 920, the UE2 transmits the feedback signal to the UE1.

Step 922, the UE1 transmits the establishing connection signal to the base station.

Step 924, the UE2 forwards downlink data to the base station transmitted by the UE1.

The above embodiments of the present disclosure provides data forwarding service for the UE with poor channel quality using idle UE, and have specific applicable scenarios and advantages. For example, special relay nodes is not needed, when the edge UE cannot find an appropriate cooperative transmission node, a terminal auxiliary transmission way can be used.

The above drawings combined with detailed description illustrate the embodiments of the present disclosure. The present disclosure provides a new technical solution, which enables accurately to determine the terminal assisted in communication. A problem of wasting communication sources is avoided due to blind assistance. And when the channel quality of between the terminal and the base station is poor, higher channel quality of the terminal between the terminal and the base station and higher data transmission rate can be ensured.

The above mentioned embodiments are only preferable embodiments. The present disclosure is not to be construed as being limited thereto. It is obvious that the present disclosure has various changes or modifications for persons skilled in the art. Any change or equivalent replacements or modifications may be made to the present disclosure without departing from the scope and spirit of the present disclosure.

We claim:

1. A computer-implemented auxiliary communication method applicable to a terminal, comprising:

receiving notification information and auxiliary communication information of assisting any terminal to perform a communication transmitted by a device having a base station function, wherein the auxiliary communication information comprises: a link direction of the auxiliary communication, spectrum information used by the any terminal to communicate with the auxiliary terminal, a time-frequency position of a discovery signal transmitted by the any terminal or the auxiliary terminal, scrambling sequence information used by the any terminal to communicate with the auxiliary terminal, wherein the device having a base station function determining an amount of data to be transmitted to the any terminal in a data buffer corresponding to the any terminal; or determining an amount of data to be transmitted by the any terminal according to a buffer state report index transmitted by the any terminal in a media access control layer; and determining that it is needed to provide the auxiliary communication for the any terminal according to the data to be transmitted to the any terminal or the data to be transmitted by the any terminal;

transmitting a first discovery signal at a first time-frequency position for the any terminal to receive the first discovery signal and transmit first response information, when the any terminal needs to be assisted to perform a downlink communication according to the auxiliary communication information;

transmitting confirmation information to the device having the base station function when the first response information transmitted by the any terminal is received, the confirmation information representing that a connection to the any terminal is finished establishing;

determining that the terminal is needed to provide at least one of: (a) a downlink auxiliary communication for the any terminal when a channel quality value of a downlink communication channel with the any terminal is less than or equal to a first predetermined value and the amount of data to be transmitted to the any terminal is more than or equal to a second predetermined value;

and (b) an uplink auxiliary communication for the any terminal when a channel quality value of an uplink communication channel with the any terminal is less than or equal to a third predetermined value and the amount of data to be transmitted by the any terminal is more than or equal to a fourth predetermined value.

2. The auxiliary communication method of claim 1, further comprising:
receiving a second discovery signal transmitted by the any terminal at a second time-frequency position when the any terminal needs to be assisted to perform an uplink communication according to the auxiliary communication information, and transmitting second response information to the any terminal.

3. The auxiliary communication method of claim 2, further comprising:
receiving first communication data transmitted by the device having the base station function when the any terminal needs to be assisted to perform the downlink communication, transmitting the first communication data to the any terminal after performing power amplification on the first communication data, or demodulating the first communication data and transmitting the first demodulated data to the any terminal after modulating the first demodulated data according to channel quality with the any terminal; and
receiving second communication data transmitted by the any terminal when the any terminal needs to be assisted to perform the uplink communication, and transmitting processed data to the device having the base station function after performing power amplification on the second communication data, or demodulating the second communication data, and transmitting modulated data to the device having the base station function after modulating the second demodulated data according to channel quality with the device having the base station function.

4. The auxiliary communication method of claim 2, wherein the first time-frequency position and the second time-frequency position is determined by:
determining a time-frequency position of the first discovery signal notified in the auxiliary communication information as the first time-frequency position, and/or determining a time-frequency position of the second discovery signal notified in the auxiliary communication information as the second time-frequency position; or
selecting a specified time-frequency position in predetermined time-frequency sources as the first time-frequency position and/or the second time-frequency position.

5. The auxiliary communication method of claim 1, before transmitting the first discovery signal, further comprising:
scrambling the first discovery signal through scrambling sequences in the auxiliary communication information.

6. A terminal, comprising:
at least one processor; and
a storage device storing a plurality of instructions, which when executed by the processor, causes the at least one processor to:
receive notification information and auxiliary communication information of assisting any terminal to perform a communication transmitted by a device having a base station function, and receive a first response information transmitted by the any terminal, wherein the auxiliary communication information comprises: a link direction of the auxiliary communication, spectrum information used by the any terminal to communicate with the auxiliary terminal, a time-frequency position of a discovery signal transmitted by the any terminal or the auxiliary terminal, scrambling sequence information used by the any terminal to communicate with the auxiliary terminal, wherein the device having a base station function determining an amount of data to be transmitted to the any terminal in a data buffer corresponding to the any terminal; or determining an amount of data to be transmitted by the any terminal according to a buffer state report index transmitted by the any terminal in a media access control layer; and determining that it is needed to provide the auxiliary communication for the any terminal according to the data to be transmitted to the any terminal or the data to be transmitted by the any terminal;
transmit a first discovery signal at a first time-frequency position for the any terminal to receive the first discovery signal and transmit first response information, when the any terminal needs to be assisted to perform a downlink communication according to the auxiliary communication information; and
transmit confirmation information to the device having the base station function when the first response information transmitted by the any terminal is received, the confirmation information representing that a connection to the any terminal is finished establishing;
determining that the terminal is needed to provide at least one of: (a) a downlink auxiliary communication for the any terminal when a channel quality value of a downlink communication channel with the any terminal is less than or equal to a first predetermined value and the amount of data to be transmitted to the any terminal is more than or equal to a second predetermined value; and (b) an uplink auxiliary communication for the any terminal when a channel quality value of an uplink communication channel with the any terminal is less than or equal to a third predetermined value and the amount of data to be transmitted by the any terminal is more than or equal to a fourth predetermined value.

7. The terminal of claim 6, wherein the at least one processor further:
receives a second discovery signal transmitted by the any terminal at a second time-frequency position when the any terminal needs to be assisted to perform an uplink communication according to the auxiliary communication information;
transmits second response information to the any terminal when the second discovery signal is received.

8. The terminal of claim 7, wherein the at least one processor further:
receives first communication data transmitted by the device having the base station function when the any terminal needs to be assisted to perform the downlink communication and transmits the first communication data to the any terminal after performing power amplification on the first communication data, or demodulates the first communication data and transmits the first demodulated data to the any terminal after modulating the first demodulated data according to channel quality with the any terminal; and
receives second communication data transmitted by the any terminal when the any terminal needs to be assisted to perform the uplink communication and transmits processed data to the device having the base station function after performing power amplification on the second communication data, or demodulates the second communication data and transmits modulated data to the device having the base station function after modulating the second demodulated data according to channel quality with the device having the base station function.

9. The auxiliary communication method of claim 7, wherein the first time-frequency position and the second time-frequency position is determined by:
   determining a time-frequency position of the first discovery signal notified in the auxiliary communication information as the first time-frequency position, and/or determining a time-frequency position of the second discovery signal notified in the auxiliary communication information as the second time-frequency position; or
   selecting a specified time-frequency position in predetermined time-frequency sources as the first time-frequency position and/or the second time-frequency position.

10. The auxiliary communication method of claim 6, wherein the at least one processor further:
   scrambling the first discovery signal through scrambling sequences in the auxiliary communication information before transmitting the first discovery signal.

* * * * *